(12) United States Patent
Gadhe et al.

(10) Patent No.: US 11,568,056 B2
(45) Date of Patent: Jan. 31, 2023

(54) METHODS AND APPARATUSES FOR VULNERABILITY DETECTION AND MAINTENANCE PREDICTION IN INDUSTRIAL CONTROL SYSTEMS USING HASH DATA ANALYTICS

(71) Applicant: Honeywell International Inc., Morris Plains, NJ (US)

(72) Inventors: Ganesh Gadhe, Phoenix, AZ (US); Eric Knapp, Boston, MA (US); Virgil Mehalek, Dover, NH (US); Doug Swain, Dover, NH (US)

(73) Assignee: Honeywell International Inc., Morris Plains, NJ (US)

( * ) Notice: Subject to any disclaimer, the term of this patent is extended or adjusted under 35 U.S.C. 154(b) by 500 days.

(21) Appl. No.: 16/590,793

(22) Filed: Oct. 2, 2019

(65) Prior Publication Data

US 2021/0103663 A1 Apr. 8, 2021

(51) Int. Cl.
*G06F 16/00* (2019.01)
*G06F 21/57* (2013.01)
*G05B 19/042* (2006.01)
*G06F 16/953* (2019.01)
*G06F 16/901* (2019.01)

(52) U.S. Cl.
CPC ....... *G06F 21/577* (2013.01); *G05B 19/0425* (2013.01); *G06F 16/9014* (2019.01); *G06F 16/953* (2019.01)

(58) Field of Classification Search
CPC .. G06F 21/577; G06F 16/953; G06F 16/9014; G05B 19/0425
See application file for complete search history.

(56) References Cited

U.S. PATENT DOCUMENTS

| | | | |
|---|---|---|---|
| 8,413,247 B2* | 4/2013 | Hudis | H04L 63/1433 709/224 |
| 2008/0229421 A1 | 9/2008 | Hudis et al. | |
| 2017/0351877 A1 | 12/2017 | Knapp et al. | |
| 2018/0046928 A1* | 2/2018 | Jang | H04L 63/1416 |
| 2018/0063181 A1* | 3/2018 | Jones | H04L 63/1433 |

FOREIGN PATENT DOCUMENTS

WO 2016/025226 A1 2/2016

OTHER PUBLICATIONS

European Search Opinion issued in European Application No. 20199955.4 dated Feb. 8, 2021, 3 pages.
European Search Report issued in European Application No. 20199955.4 dated Feb. 8, 2021, 2 pages.
List of references cited by examiner dated Jul. 8, 2022 for U.S. Appl. No. 17/038,763.
Non-Final Office Action received for U.S. Appl. No. 17/038,763, dated Jul. 8, 2022, 11 pages.
Notice of Allowance and Fees Due (PTOL-85) dated Oct. 26, 2022 for U.S. Appl. No. 17/038,763.

* cited by examiner

*Primary Examiner* — Hung Q Pham
(74) *Attorney, Agent, or Firm* — Alston & Bird LLP (57) ABSTRACT

Method, apparatus and computer program product for detecting vulnerability and predicting maintenance in an industrial control system are described herein.

20 Claims, 5 Drawing Sheets

METHODS AND APPARATUSES FOR VULNERABILITY DETECTION AND MAINTENANCE PREDICTION IN INDUSTRIAL CONTROL SYSTEMS USING HASH DATA ANALYTICS

TECHNOLOGICAL FIELD

Embodiments of the invention relate, generally, to programmatically detecting vulnerability and predicting maintenance in an industrial control system using hash analytics.

BACKGROUND

In industrial control systems (ICS) and industrial internet of things (IIoT) environments, identification of vulnerable industrial computing product running in the computing environment has historically been difficult. In ICSs, the resources that can be devoted to vulnerability analysis are often limited, for example, due to issues such as lack of Internet activity, interoperability issues, limitations on computing resources such as central processing unit (CPU), memory, input/output (I/O) constraints, or the like. Moreover, regular maintenance checkups that may address potential vulnerability in the ICSs are generally infrequent, at least in part because these maintenance checkups may require downtime may lead to loss of productivity in the industrial production sites associated with the ICSs.

Applicant has identified a number of deficiencies and problems associated with vulnerability detection/prediction and maintenance prediction in ICSs. Through applied effort, ingenuity, and innovation, many of these identified problems have been solved by developing solutions that are included in embodiments of the present disclosure, many examples of which are described in detail herein.

BRIEF SUMMARY

This specification relates to methods, systems, apparatuses, and computer program products for detecting vulnerability and predicting maintenance in an industrial control system using hash analytics.

In some embodiments, a method for detecting vulnerability in an industrial control system is provided. The method includes receiving a hash query from a secure media exchange node. The hash query includes a file hash generated at the secure media exchange node based at least in part on one or more industrial control files received at the secure media exchange node and associated with at least one of one or more ICS computing components in an industrial control system (ICS). The method further includes querying an ICS computing component hash information database based on the hash query to generate one or more ICS computing component information items associated with at least one of the one or more ICS computing components by comparing the hash query with one or more hashes stored in the ICS computing component hash information database. The method further includes generating a vulnerability analysis regarding the industrial control system based on the one or more ICS computing component information items. The method further includes outputting the vulnerability analysis to a secure media exchange vulnerability portal associated with the secure media exchange node.

In some embodiments, the ICS computing component hash information database includes an ICS computing component threat intelligence database configured to store at least one or more security threat hashes representing one or more security threats associated with one or more industrial control files. In some embodiments, the method further includes: querying the ICS computing component threat intelligence database with the hash query; and upon determining that the file hash in the hash query matches at least one of the one or more security threat hashes, generating one or more threat indicators representing the one or more security threats in the ICS system as the one or more ICS computing component information items.

In some embodiments, the one or more security threats are each associated with one of the one or more ICS computing components. In some embodiments, the one or more security threats are one or more of: one or more known security vulnerabilities, one or more viruses, or one or more trojans.

In some embodiments, the ICS computing component hash information database comprises an ICS computing component vulnerability prediction database configured to store one or more hashes associated with one or more industrial control files. In some embodiments, the method further includes: querying the ICS computing components vulnerability prediction database with the hash query; receiving one or more predictive indicators, each of the one or more predictive indicators are associated with at least one of the one or more components; and generating the vulnerability analysis based on the one or more predictive indicators. In some embodiments, the one or more predictive indicators include one or more of: a version number associated with at least one of the one or more industrial control files, an updated timestamp associated with at least one of the one or more industrial control files, or an outdated file flag representing that one or more files associated with at least one of the one or more industrial control files is not in the one or more industrial control files.

In some embodiments, the secure media exchange vulnerability portal is a web-based portal installed on the secure media exchange node.

In some embodiments, the secure media exchange vulnerability portal is associated with the ICS computing component hash information database.

In some embodiments, the one or more ICS computing components do not have access to the world wide web while the ICS is in operation.

In some embodiments, the method further includes querying the ICS computing component hash information database based on the hash query to identify at least one component of the one or more ICS computing components and storing the identified component in an ICS computing components model associated with the ICS.

In another embodiment, an apparatus configured to programmatically detect vulnerability in an industrial control system is provided. The apparatus comprising at least a processor, and a memory associated with the processor having computer coded instructions therein, with the computer coded instructions configured to, when executed by the processor, cause the apparatus to: receive a hash query from a secure media exchange node. The hash query comprises a file hash generated at the secure media exchange node based at least in part on one or more industrial control files received at the secure media exchange node and associated with at least one of one or more ICS computing components in an industrial control system (ICS).

In some embodiments, the computer coded instructions are further configured to, when executed by the processor, cause the apparatus to query an ICS computing component hash information database based on the hash query to generate one or more ICS computing component information items associated with at least one of the one or more ICS computing components by comparing the hash query with one or more hashes stored in the ICS computing component hash information database.

In some embodiments, the computer coded instructions are further configured to, when executed by the processor, cause the apparatus to generate a vulnerability analysis regarding the industrial control system based on the one or more ICS computing component information items.

In some embodiments, the computer coded instructions are further configured to, when executed by the processor, cause the apparatus to output the vulnerability analysis to a secure media exchange vulnerability portal associated with the secure media exchange node.

In some embodiments, the ICS computing component hash information database comprises an ICS computing component threat intelligence database configured to store at least one or more security threat hashes representing one or more security threats associated with one or more industrial control files. In some embodiments, the computer coded instructions are further configured to, when executed by the processor, cause the apparatus to: query the ICS computing component threat intelligence database with the hash query; and upon determining that the file hash in the hash query matches at least one of the one or more security threat hashes, generate one or more threat indicators representing the one or more security threats in the ICS system as the one or more ICS computing component information items.

In some embodiments, the one or more security threats are each associated with one of the one or more ICS computing components.

In some embodiments, the one or more security threats are one or more of: one or more known security vulnerabilities, one or more viruses, or one or more trojans.

In some embodiments, the ICS computing component hash information database comprises an ICS computing component vulnerability prediction database configured to store one or more hashes associated with one or more industrial control files. In some embodiments, the computer coded instructions are further configured to, when executed by the processor, cause the apparatus to: query the ICS computing components vulnerability prediction database with the hash query; receive one or more predictive indicators, wherein each of the one or more predictive indicators are associated with at least one of the one or more components; and generate the vulnerability analysis based on the one or more predictive indicators.

In some embodiments, the one or more predictive indicators include one or more of: a version number associated with at least one of the one or more industrial control files, an update timestamp associated with at least one of the one or more industrial control files, or an outdated file flag representing that one or more files associated with at least one of the one or more industrial control files is not in the one or more industrial control files.

In some embodiments, the secure media exchange vulnerability portal is a web-based portal installed on the secure media exchange node. In some embodiments, the secure media exchange vulnerability portal is associated with the ICS computing component hash information database. In some embodiments, the one or more ICS computing components do not have access to the world wide web while the ICS is in operation.

In some embodiments, the computer coded instructions are further configured to, when executed by the processor, cause the apparatus to query the ICS computing component hash information database based on the hash query to identify at least one component of the one or more ICS computing components and store the identified component in an ICS computing components model associated with the ICS.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

Definitions

The phrases "in one embodiment," "according to one embodiment," "for example," "in some examples," "as an example," and the like generally mean that the particular feature, structure, or characteristic following the phrase may be included in at least one embodiment of the present disclosure, and may be included in more than one embodiment of the present disclosure (such phrases do not necessarily refer to the same embodiment).

The word "example" or "exemplary" is used herein to mean "serving as an example, instance, or illustration." Any implementation described herein as "example" or "exemplary" is not necessarily to be construed as preferred or advantageous over other implementations.

If the specification states a component or feature "may," "can," "could," "should," "would," "preferably," "possibly," "typically," "optionally," "for example," "in some examples," "often," or "might" (or other such language) be included or have a characteristic, that a specific component or feature is not required to be included or to have the characteristic. Such component or feature may be optionally included in some embodiments, or it may be excluded.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal.

The term "industrial control system" (ICS) refers to a computing system that includes one or more industrial control system computing components that each are connected to a device or machinery in an industrial system. For example, an ICS may be a supervisory control and data acquisition system that includes several programmable logic controllers distributed in various locations that provide long distance monitoring and control of field sites through a centralized control system. In another example, an ICS may be a distributed control system that is configured to control various ICS computing components that take the form of operational technology hardware and software systems. The ICS computing components that take the form of operational technology hardware and software systems may be various controllers that control an industrial production process.

The term "ICS computing component" refers to computing hardware and software system in an ICS. For example, the ICS computing component may take the form of operational technology hardware and software systems that monitors or controls physical devices in the industrial system. Example physical devices include manufacturing equipment, monitoring equipment such as storage or device monitoring equipment, manufacturing material moving equipment, or other equipment used in an industrial production site. The ICS computing component may also take the form of a programmable logic controller that provides local management of processes being run through feedback devices such as sensors and actuators. The ICS computing component may also take other forms such as a master terminal unit in a supervisory control and data acquisition system that is configured to transmit commands to or receive information from one or more remote terminal units, a remote terminal unit, a human machine interface, a control server, intelligent electronic devices that is associated with another physical device in the industrial system, or the like.

The term "industrial control files" refers to files generated by, transmitted to, or to be transmitted to an ICS computing component. Example industrial control files include, by way of example, process information in an ICS, command data, data generated by a master terminal unit or a remote terminal unit, data generated by a control server, data generated by sensors and actuators, data generated by intelligent electronic devices that is associated with physical device in the industrial system, metadata associated with generation or transmission of data of ICS computing components. In some embodiments, an industrial control file may include one or more information items that may be designated as predictive indicators that may be utilized for determining whether the ICS computing component that the industrial control file is generated from or being transmitted to is potentially vulnerable.

The term "secure media exchange node" refers to computer hardware and/or software configured to receive one or more industrial control files and generate a file hash of the one or more industrial control files. In some embodiments, the one or more industrial control files may be stored on a plug and play portable storage device. For example, the one or more industrial control files may be stored on a universal serial bus (USB) based storage device, or other physical, portable storage device, such as flash-based storage, memory-card based storage, and/or the like to be connected to an ICS computing component associated with the one or more industrial control files. For example, the USB based storage device may be connected to the secure media exchange node before the USB based storage device is connected to the ICS computing component to transmit the one or more industrial control files to the ICS computing component. In some embodiments, the USB based storage device may store one or more industrial control files generated by the ICS computing component and may transmit the one or more industrial control files to the secure media exchange node via a USB. In some embodiments, the secure media exchange node may be a device physically located within an industrial production site that the ICS operates in.

The term "vulnerability analysis" refers to a file or data structure representing one or more vulnerabilities or potential vulnerabilities that are present in one or more ICS computing components. For example, a vulnerability analysis may include data representative of one or more known security threats and/or a data indicating that one or more ICS computing components are potentially vulnerable and requires maintenance.

The term "ICS computing component information item" refers to data generated by or received by a vulnerability server regarding one or more ICS computing components based on file hashes received from a secure media exchange node. Example ICS computing component information items may include threat indicators representing one or more known security threats, predictive indicators representing potential security vulnerabilities that take the form of a version number associated with at least one of the one or more industrial control files, an update timestamp associated with at least one of the one or more industrial control files, or an outdated file flag representing that one or more files associated with at least one of the one or more industrial control files is not in the one or more industrial control files.

The term "threat indicator" refers to a data structure generated by a vulnerability server based on matching of file hashes received from a secure media exchange node and a file hash stored in an ICS computing component hash information database that represents a potential security threat in an ICS associated with the secure media exchange node.

The term "predictive indicator" refers to a data structure for predicting potential vulnerabilities associated with an industrial file. A predictive indicator may be stored along with a file hash of the industrial file. In some embodiments, a predictive indicator may include, by way of example, one or more of: a version number associated with at least one of the one or more industrial control files, an update timestamp associated with at least one of the one or more industrial control files, an outdated file flag representing that one or more files associated with at least one of the one or more industrial control files is not in the one or more industrial control files, or another form of indicator associated with the one or more file hashes.

The term "secure media exchange vulnerability portal" refers to an interface configured to render data included in a vulnerability analysis. For example, the secure media exchange vulnerability portal may take the form of a web-based portal that is accessible to one or more computing entities. In some embodiments, the secure media exchange vulnerability portal may be rendered on the secure media exchange node. In some embodiments, the secure media exchange vulnerability portal may be rendered on another device.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more secure media exchange nodes. Additionally or alternatively, the computing device may include fixed computing devices, such as a personal computer, a tablet, or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices. Additionally or alternatively, the computing device may include programmable logic controllers, microcontrollers, intelligent electronic devices that is associated with physical device in the industrial system, or other computing device that may be used to embody ICS computing components.

Figure 1:
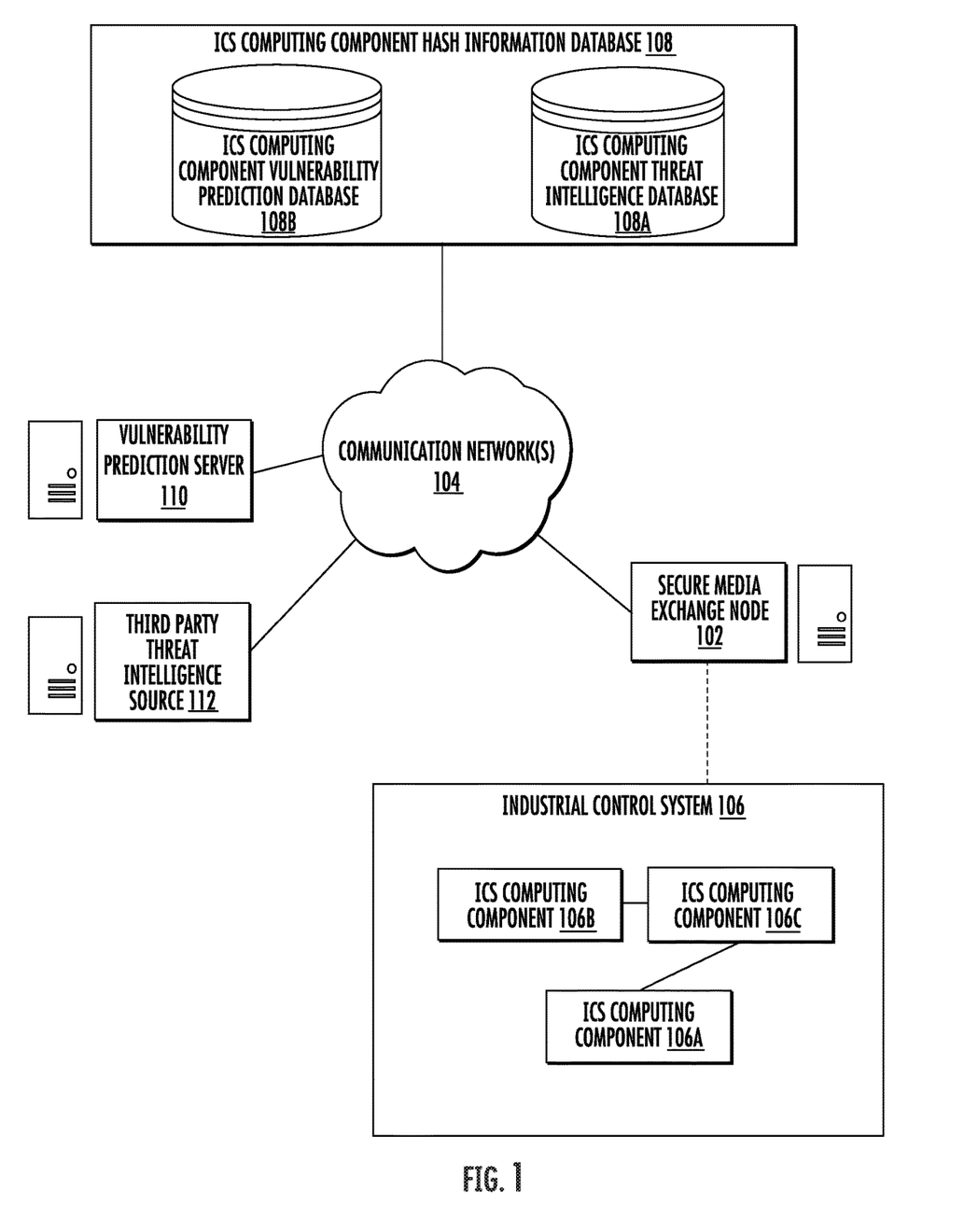
FIG. 1 is a system architecture diagram of an embodiment of the present disclosure.

FIG. 1 illustrates a system architecture diagram of embodiments of the present disclosure.

The secure media exchange node may be embodied as a computer, a tablet computer, or the like. In some embodiments, secure media exchange node 102 is configured to receive industrial control files generated from an industrial control system 106 or receive industrial control files to be transmitted to the industrial control system 106. The ICS 106 may include one or more ICS computing components 106A to 106C. In some embodiments, the industrial control system 106 may be a computing system that is not connected to the communication network 104, or any communication network that may connect to the Internet. In some embodiments, the one or more industrial control files may be stored on a portable storage device, such as a USB based storage device to be connected to an ICS computing component associated with the one or more industrial control files. For example, the USB based storage device may be connected to the secure media exchange node before the USB based storage device is connected to the ICS computing component to transmit the one or more industrial control files to the ICS computing component. In some embodiments, the USB based storage device may store one or more industrial control files generated by the ICS computing component and may transmit the one or more industrial control files to the secure media exchange node via a USB.

The secure media exchange node 102 may communicate with, via the communication network 104, a vulnerability prediction server 110. In some embodiments, the secure media exchange node 102 may transmit hashes of the one or more industrial control files to the vulnerability connection server 110 via the communication network 104. In some embodiments, the secure media exchange node may be a device physically located within an industrial production site that the ICS operates in. In some embodiments, the secure media exchange node 102 may be embodied as a computer or computers. In some embodiments, the secure media exchange node 102 is not directly connected to the ICS 106 via any form of connection network; in such embodiments, the secure media exchange node 102 receives the one or more industrial control files via the USB based storage device.

In some embodiments, the vulnerability prediction server 110 may query the ICS computing component hash information database 108 with a file hash received from the secure media exchange node 102. The vulnerability prediction server 110 may be embodied as a computer or computers. The vulnerability prediction server 110 may provide for receiving of electronic data from various sources, including but not necessarily limited to the secure media exchange node 102. For example, the vulnerability prediction server 110 may be operable to transmit and receive file hashes to or from the secure media exchange node 102. In some embodiments, the vulnerability prediction server 110 may be in communication with the ICS computing component hash information database 108 through the communication network 104 or otherwise.

The ICS computing component hash information database 108 may include one or more databases, such as an ICS computing component threat intelligence database 108A and an ICS computing component vulnerability prediction database 108B. In some embodiments, the ICS computing component hash information database 108 may store one or more file hashes. The one or more file hashes may each be identified, in the ICS computing component hash information database 108, as a safe file hash or a security threat hash. In some embodiments, the one or more file hashes may be also associated with one or more ICS computing component identifiers, one or more predictive indicators, one or more threat indicators, or the like.

Communications network 104 may include any wired or wireless communication network including, for example, a wired or wireless Personal Area Network (PAN), Local Area Network (LAN), Metropolitan Area Network (MAN), Wide Area Network (WAN), and/or the like. For example, in various embodiments, the one or more communication networks 35 described herein may use any of a variety of protocols, such as general packet radio service (GPRS), Universal Mobile Telecommunications System (UMTS), Code Division Multiple Access 2000 (CDMA2000), CDMA2000 1x(1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Bluetooth protocols, wireless universal serial bus (USB) protocols, and/or any other wireless protocol.

The ICS computing component hash information database 108 may be embodied as a data storage device such as a Network Attached Storage (NAS) device or devices, or as a separate database server or servers. The ICS computing component hash information database 108 includes file hashes of one or more industrial files and data associated with the file hashes. For example, the ICS computing component hash information database 108 may include, without limitation, outdated file flags associated with the file hashes, updated timestamps associated with the file hashes, version numbers associated with the file hashes, predictive indicators associated with the file hashes, threat indicators associated with the file hashes, or the like. The ICS computing component hash information database 108 may include an ICS computing component threat intelligence database 108A and an ICS computing component vulnerability prediction database 108B. In some embodiments, the ICS computing component vulnerability prediction database 108B includes one or more security threat hashes which are file hashes for industrial control files with known security threats. In some embodiments, the ICS computing component vulnerability prediction database 108B includes one or more predictive indicators associated with one or more file hashes; the predictive indicators may include one or more of: a version number associated with at least one of the one or more industrial control files, an updated timestamp associated with at least one of the one or more industrial control files, an outdated file flag representing that one or more files associated with at least one of the one or more industrial control files is not in the one or more industrial control files, a flag representing that the one or more industrial files that indicate maintenance, one or more industrial files that are associated with software tools related to maintenance, or another form of indicator associated with the one or more file hashes.

In some embodiments, the ICS computing component hash information database 108 may be periodically updated by communicating, via the communication network 104, with a third-party threat intelligence source 112. In some embodiments, the third-party threat intelligence source 112 may be embodied as a separate database server or servers managed by an entity that is different from the entity managing the secure media exchange node 102. In some embodiments, the ICS computing component hash information database 108 may also store one or more ICS system models that include information regarding one or more ICS computing components and association between different models of ICS computing components. For example, an ICS system model may indicate that an ICS computing component with a model number of 89114 by manufacturer ACME may be determined to be associated with one or more ICS computing components of different model numbers by manufacturer ACME or a different manufacturer. In some embodiments, the ICS system models stored in the ICS computing component hash information database 108 may be updated periodically.

In some embodiments, the ICS computing component hash information database 108 may be in communication with the vulnerability prediction server 110 through the communication network 104. In some embodiments, the ICS computing component hash information database 108 may be contained in the vulnerability prediction server 110.

Example System Configuration

Figure 2:
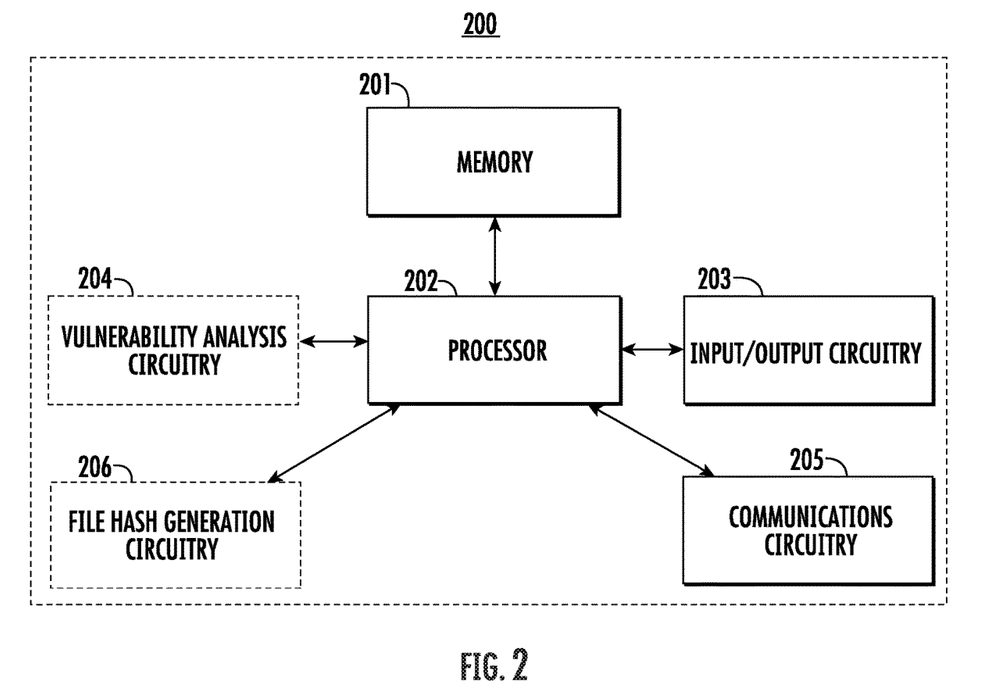
FIG. 2 is a schematic diagram of an exemplary computing entity according to one embodiment of the present disclosure.

The secure media exchange node 102 or the vulnerability prediction server 110, may be embodied by one or more computing systems and include one or more components shown in circuitry 200 shown in FIG. 2. The circuitry 200 may include a processor 202, a memory 201, input/output circuitry 203, communications circuitry 205, and optionally the vulnerability analysis circuitry 204 (for the vulnerability prediction server 110) or file hash generation circuitry 206 (for the secure media exchange node 102). The circuitry 200 may, in some embodiments, also include the ICS computing component hash information database 108. In some embodiments, the ICS computing component hash information database 108 may be stored on the memory 201. The circuitry 200 may be configured to execute the operations described herein. Although these components 110 and 201-205 are described with respect to functional limitations, it should be understood that the particular implementations necessarily include the use of particular hardware. It should also be understood that certain of these components 110 and 201-206 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the circuitry 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, identifiers, requests, communications, or the like, for enabling the apparatus to carry out various functions in accordance with example embodiments of the present disclosure.

The memory 201 may include a non-volatile computer-readable storage medium such as a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the circuitry 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the circuitry 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The vulnerability analysis circuitry 204 includes hardware configured to generate a vulnerability analysis. The vulnerability analysis circuitry 204 may utilize processing circuitry, such as the processor 202, to perform these actions. The vulnerability analysis circuitry 204 may send and/or receive data from ICS computing component hash information database 108. In some implementations, the sent and/or received data may be file hashes, threat indicators, predictive indicators, or the like. It should also be appreciated that, in some embodiments, the vulnerability analysis circuitry 204 may include a separate processor, specially configured field programmable gate array (FPGA), or application specific interface circuit (ASIC).

The file hash generation circuitry 206 includes hardware configured to generate one or more file hashes of one or more industrial control files received. The file hash generation circuitry 206 may utilize processing circuitry, such as the processor 202, to perform these actions. It should also be appreciated that, in some embodiments, the vulnerability analysis circuitry 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example System Operations

Figure 3:
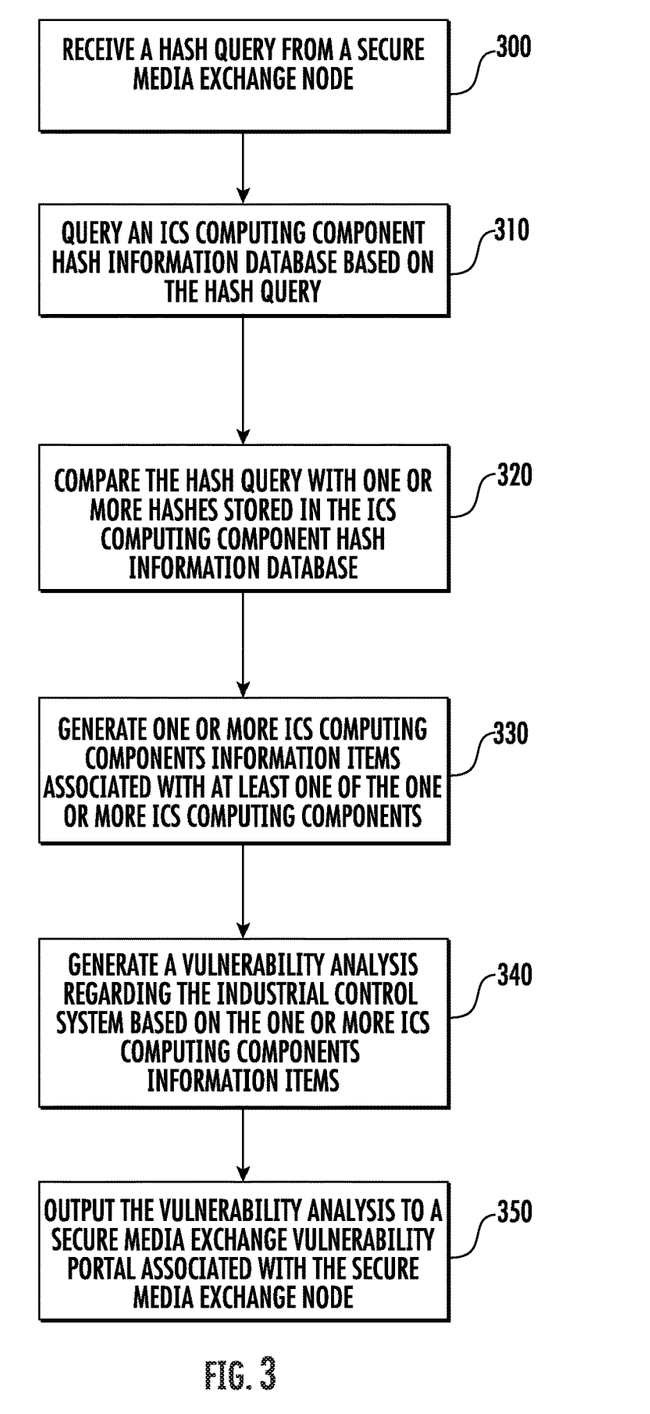
FIG. 3 is a flowchart illustrating operations for detecting vulnerability and predicting maintenance in an industrial control system using hash analytics according to embodiments of the present disclosure.

Referring now to FIG. 3, a flowchart is provided to illustrate operations that are executed by an example embodiment of an apparatus used to embody various components illustrated in FIG. 1, such as the vulnerability prediction server 110, for programmatically detecting vulnerability and predicting maintenance in an industrial control system. FIG. 3 and other flowcharts herein are for illustrative purposes and are not to be limiting unless otherwise stated herein. Unless otherwise noted, various operations discussed in FIG. 3 and other flowcharts may be used in the same or separate embodiments of the present disclosure.

A secure media exchange node 102 may receive one or more industrial control files associated with at least one of one or more ICS computing components in an industrial control system. The secure media exchange node 102 may use the file hash generation circuitry 206 to generate one or more file hashes of the one or more industrial control files. The secure media exchange node 102 may transmit a hash query that includes the one or more file hashes to the vulnerability prediction server 110. As shown in Block 300 of FIG. 3, the vulnerability prediction server 110 is configured to receive a hash query from a secure media exchange node 102.

In some embodiments, secure media exchange node 102 is configured to receive the industrial control files generated from the at least one of one or more ICS computing components in the industrial control system or receive industrial control files to be transmitted to the at least one of one or more ICS computing components in the industrial control system. In some embodiments, the industrial control system may be a computing system that is not connected to the communication network 104, or any communication network that may connect to the Internet. In some embodiments, the one or more industrial control files may be stored on a USB based storage device to be connected to an ICS computing component associated with the one or more industrial control files. For example, the USB based storage device may be connected to the secure media exchange node before the USB based storage device is connected to the ICS computing component to transmit the one or more industrial control files to the ICS computing component. In some embodiments, the USB based storage device may store one or more industrial control files generated by the ICS computing component and may transmit the one or more industrial control files to the secure media exchange node via a USB. In some embodiments, the secure media exchange node may use the file hash generation circuitry 206 to generate the file hash.

As shown in Block 310 of FIG. 3, the vulnerability prediction server 110 is configured to query an ICS computing component hash information database 108 based on the hash query. The ICS computing component hash information database 108 may include one or more databases, such as an ICS computing component threat intelligence database 108A and an ICS computing component vulnerability prediction database 108B. In some embodiments, the ICS computing component hash information database 108 may store one or more file hashes. The one or more file hashes may each be identified, in the ICS computing component hash information database 108, as a safe file hash, a file hash associated with a predictive indicator, or a security threat hash. In some embodiments, the one or more file hashes may be also associated with one or more ICS computing component identifiers, one or more predictive indicators, one or more threat indicators, or the like. In some embodiments, a file hash not identified in the ICS computing component hash information database 108 is considered to be a safe file hash.

The ICS computing component hash information database 108 may be embodied as a data storage device such as a Network Attached Storage (NAS) device or devices, or as a separate database server or servers. The ICS computing component hash information database 108 includes file hashes of one or more industrial files and data associated with the file hashes. For example, the ICS computing component hash information database 108 may include, without limitation, outdated file flags associated with the file hashes, updated timestamps associated with the file hashes, version numbers associated with the file hashes, predictive indicators associated with the file hashes, threat indicators associated with the file hashes, or the like. The ICS ssscomputing component hash information database 108 may include an ICS computing component threat intelligence database 108A and an ICS computing component vulnerability prediction database 108B. In some embodiments, the ICS computing component vulnerability prediction database 108B includes one or more security threat hashes which are file hashes for industrial control files with known security threats. In some embodiments, the ICS computing component threat intelligence database 108A includes one or more predictive indicators associated with one or more file hashes; the predictive indicators may include one or more of: a version number associated with at least one of the one or more industrial control files, an updated timestamp associated with at least one of the one or more industrial control files, an outdated file flag representing that one or more files associated with at least one of the one or more industrial control files is not in the one or more industrial control files, or another form of indicator associated with the one or more file hashes.

As shown in Block 320 of FIG. 3, the vulnerability prediction server 110 is configured to compare the hash query with one or more hashes stored in the ICS computing component hash information database.

As shown in Block 330 of FIG. 3, the vulnerability prediction server 110 is configured to generate one or more ICS computing component information items associated with at least one of the one or more ICS computing components. In some embodiments, the vulnerability prediction server 110 generates the one or more ICS computing component information items associated with at least one of the one or more ICS computing components upon determining that the hash query matches at least one of the one or more hashes stored in the ICS computing component hash information database.

As shown in Block 340 of FIG. 3, the vulnerability prediction server 110 is configured to generate a vulnerability analysis regarding the industrial control system based on the one or more ICS computing component information items. A vulnerability analysis may be embodied as a file or data structure representing one or more vulnerabilities or potential vulnerabilities that are present in one or more ICS computing components. For example, a vulnerability analysis may include data representative of one or more known security threats and/or data indicating that one or more ICS computing components are potentially vulnerable and require maintenance.

As shown in Block 350 of FIG. 3, the vulnerability prediction server 110 is configured to output the vulnerability analysis to a secure media exchange vulnerability portal associated with the secure media exchange node 102. A secure media exchange vulnerability portal is an interface configured to render data included in a vulnerability analysis. For example, the secure media exchange vulnerability portal may take the form of a web-based portal that is accessible to one or more computing entities. In some embodiments, the secure media exchange vulnerability portal may be rendered on the secure media exchange node 102. In some embodiments, the interface may include a warning message associated with one or more security threats and/or a message indicating on-site maintenance is needed for the ICS.

Additional Example System Operations

Figure 4A:
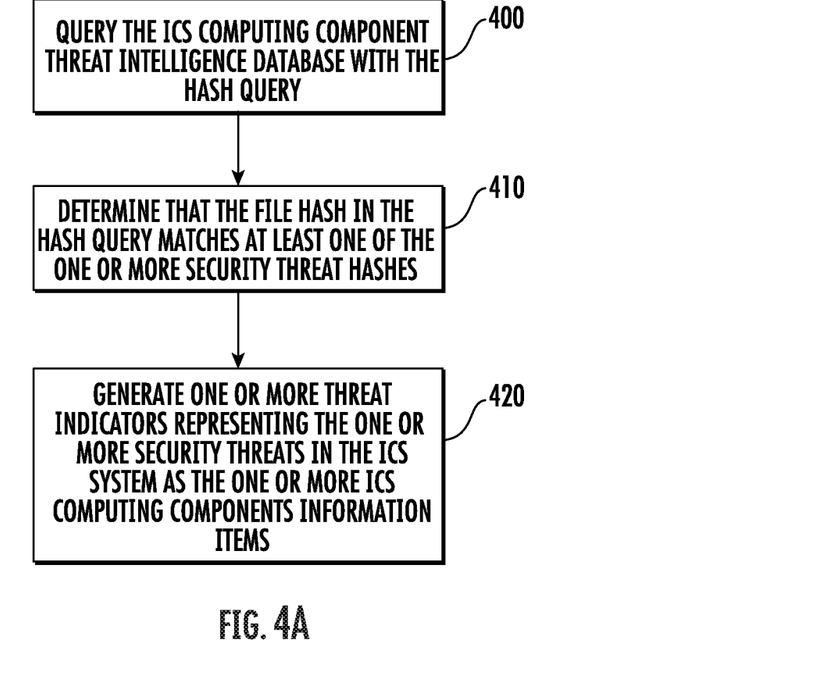
FIGS. 4A and 4B are other flowcharts illustrating operations for detecting vulnerability and predicting maintenance in the industrial control system using hash analytics according to embodiments of the present disclosure.

Referring now to FIG. 4A, an additional flowchart is provided to illustrate operations that are executed by an example embodiment of an apparatus used to embody various components illustrated in FIG. 1, such as the vulnerability prediction server 110, for programmatically detecting vulnerability and predicting maintenance in an industrial control system.

As shown in Block 400 of FIG. 4A, the vulnerability prediction server 110 is configured to query an ICS computing component threat intelligence database with a hash query, such as a hash query as discussed above, which may be received from a secure media exchange node 102. As previously described, the ICS computing component threat intelligence database is included as part of the ICS computing component hash information database and is configured to store at least one or more security threat hashes representing one or more security threats associated with one or more industrial control files. The one or more security threats may be known security threats, such as backdoors, vulnerabilities, viruses, trojans, or the like. In some embodiments, information regarding the one or more security threats may be stored in the ICS computing component threat intelligence database.

As shown in Block 410 of FIG. 4A, the vulnerability prediction server 110 is configured to determine that at least one file hash in the hash query matches at least one of the one or more security threat hashes. In some embodiments, in instances in which the vulnerability prediction server 110 does not determine that the hash query matches at least one of the one or more security threat hashes, the vulnerability prediction server 110 may be configured to proceed with the workflow described later in conjunction with FIG. 4B.

As shown in Block 420 of FIG. 4A, the vulnerability prediction server 110 is configured to generate one or more threat indicators representing the one or more security threats as the one or more ICS computing component information items. In some embodiments, the information regarding the one or more security threats stored in the ICS computing component threat intelligence database may be fetched by the vulnerability prediction server and included in the one or more threat indicators. In some embodiments, a distinctive threat indicator may be generated for each file hash that matches the security threat hashes.

Figure 4B:
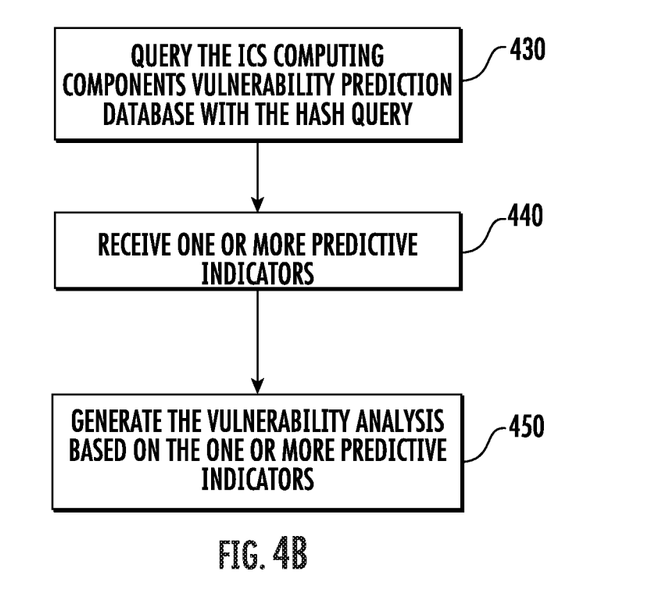

Referring now to FIG. 4B, an additional flowchart is provided to illustrate operations that are executed by an example embodiment of an apparatus used to embody various components illustrated in FIG. 1, such as the vulnerability prediction server 110, for programmatically detecting vulnerability and predicting maintenance in an industrial control system.

As shown in Block 430 of FIG. 4B, the vulnerability prediction server 110 is configured to query the ICS computing component vulnerability prediction database with the hash query. As previously described, the ICS computing component vulnerability prediction database is part of the ICS component hash information database and includes one or more predictive indicators associated with one or more file hashes. the predictive indicators may include one or more of: a version number associated with at least one of the one or more industrial control files, an updated timestamp associated with at least one of the one or more industrial control files, an outdated file flag representing that one or more files associated with at least one of the one or more industrial control files is not in the one or more industrial control files, a flag representing that the one or more industrial files that indicate maintenance, one or more industrial files that are associated with software tools related to maintenance, or another form of indicator associated with the one or more file hashes.

As shown in Block 440 of FIG. 4B, the vulnerability prediction server 110 is configured to receive the one or more predictive indicators from the ICS computing component vulnerability prediction database.

As shown in Block 450 of FIG. 4B, the vulnerability prediction server 110 is configured to generate the vulnerability analysis based on the one or more predictive indicators. In some embodiments, by way of example, the vulnerability analysis may be generated by comparing the updated timestamp with a pre-defined timestamp representing a potentially vulnerable version. If the updated timestamp is earlier than the pre-defined timestamp, the vulnerability analysis may be generated to indicate that the industrial file associated with the update timestamp is potentially vulnerable. In another example, the vulnerability analysis may be generated by determining that the one or more file hashes associated with the industrial files received are associated with an outdated file flag because one or more files associated with at least one of the one or more industrial control files that are pre-defined to be associated with (e.g., because the one or more files should be present, along with the one or more industrial control files received, in a pre-defined non-vulnerable version) at least one of the one or more industrial control files are not in the one or more industrial control files.

In some embodiments, the vulnerability analysis may be generated by comparing a version number associated with the one or more industrial control files with a pre-defined version number. If the version number associated with the one or more industrial control files indicates that the version of the one or more industrial control files is earlier than a version associated with the pre-defined version number, the vulnerability analysis may indicate that the one or more industrial control files are potentially vulnerable. In some embodiments, the vulnerability analysis may be generated by using a combination of one or more of the example methods described above. In some embodiments, the vulnerability analysis generated based on predictive indicators may indicate that on-site maintenance is needed at the ICS.

Figure 5:
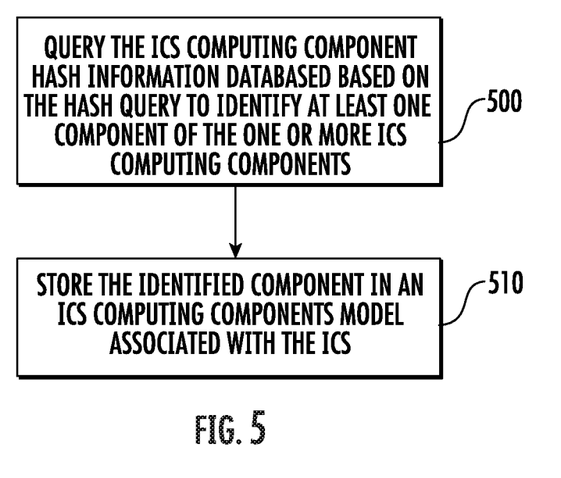
FIG. 5 is another flowchart illustrating operations for programmatically building an ICS computing component model based on the one or more industrial files received according to embodiments of the present disclosure.

Referring now to FIG. 5, an additional flowchart is provided to illustrate operations that are executed by an example embodiment of an apparatus used to embody various components illustrated in FIG. 1, such as the vulnerability prediction server 110, for programmatically building an ICS computing components model based on the one or more industrial files received.

As shown in Block 500 of FIG. 5, the vulnerability prediction server 110 is configured to query the ICS computing component hash information database based on the hash query to identify at least one component of the one or more ICS computing components.

As shown in Block 510 of FIG. 5, the vulnerability prediction server 110 is configured to store the identified component in an ICS computing components model associated with the ICS. In some embodiments, the ICS computing components model may be generated based on one or more ICS system models that include information regarding one or more ICS computing components and association between different models of ICS computing components. The one or more ICS system models may be stored in the ICS computing component hash information database 108. For example, an ICS system model may indicate that an ICS computing component with a model number of 89114 by manufacturer ACME may be determined to be associated with one or more ICS computing components of different model numbers by manufacturer ACME or a different manufacturer. In some embodiments, the one or more ICS system models may be updated periodically based on the ICS computing components model.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

As described above, FIGS. 3, 4A, 4B and 5 illustrate flowcharts of apparatuses and methods according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for detecting vulnerability in an industrial control system, comprising:
   receiving a hash query in response to a portable storage device being communicatively coupled to a secure media exchange node, wherein the hash query comprises a file hash generated at the secure media exchange node based at least in part on one or more industrial control files stored on the portable storage device and associated with at least one of one or more ICS computing components in an industrial control system (ICS);
   querying an ICS computing component hash information database based on the hash query to generate one or more ICS computing component information items associated with at least one of the one or more ICS computing components by comparing the hash query with one or more hashes stored in the ICS computing component hash information database;
   generating a vulnerability analysis regarding the industrial control system based on the one or more ICS computing component information items; and
   outputting the vulnerability analysis to a secure media exchange vulnerability portal associated with the secure media exchange node.

2. The method of claim 1, wherein the ICS computing component hash information database is configured to store at least one or more security threat hashes representing one or more security threats associated with one or more industrial control files, and wherein the method further comprises:
   upon determining that the file hash in the hash query matches at least one of the one or more security threat hashes, generating one or more threat indicators representing the one or more security threats in the ICS system based on the one or more ICS computing component information items.

3. The method of claim 2, wherein the one or more security threats are each associated with one of the one or more ICS computing components.

4. The method of claim 2, wherein the one or more security threats are one or more of: one or more known security vulnerabilities, one or more viruses, or one or more trojans.

5. The method of claim 1, wherein the ICS computing component hash information database is configured to store one or more hashes associated with one or more industrial control files, and wherein the method further comprises:
determining one or more predictive indicators associated with at least one of the one or more ICS computing components; and
generating the vulnerability analysis based on the one or more predictive indicators.

6. The method of claim 5, wherein the one or more predictive indicators include one or more of: a version number associated with at least one of the one or more industrial control files, an updated timestamp associated with at least one of the one or more industrial control files, or an outdated file flag representing that one or more files associated with at least one of the one or more industrial control files is not in the one or more industrial control files.

7. The method of claim 1, wherein the secure media exchange vulnerability portal is a web-based portal installed on the secure media exchange node.

8. The method of claim 1, wherein the secure media exchange vulnerability portal is associated with the ICS computing component hash information database.

9. The method of claim 1, wherein the one or more ICS computing components do not have access to the world wide web while the ICS is in operation.

10. The method of claim 1, further comprising,
querying the ICS computing component hash information database based on the hash query to identify at least one component of the one or more ICS computing components; and
storing the identified component in an ICS computing components model associated with the ICS.

11. An apparatus configured to programmatically detect vulnerability in an industrial control system, the apparatus comprising at least a processor, and a memory associated with the processor having computer coded instructions therein, with the computer coded instructions configured to, when executed by the processor, cause the apparatus to:
receive a hash query in response to a portable storage device being communicatively coupled to a secure media exchange node, wherein the hash query comprises a file hash generated at the secure media exchange node based at least in part on one or more industrial control files stored on the portable storage device and associated with at least one of one or more ICS computing components in an industrial control system (ICS);
query an ICS computing component hash information database based on the hash query to generate one or more ICS computing component information items associated with at least one of the one or more ICS computing components by comparing the hash query with one or more hashes stored in the ICS computing component hash information database;
generate a vulnerability analysis regarding the industrial control system based on the one or more ICS computing component information items; and
output the vulnerability analysis to a secure media exchange vulnerability portal associated with the secure media exchange node.

12. The apparatus of claim 11, wherein the ICS computing component hash information database is configured to store at least one or more security threat hashes representing one or more security threats associated with one or more industrial control files, and wherein the computer coded instructions are further configured to, when executed by the processor, cause the apparatus to:
upon determining that the file hash in the hash query matches at least one of the one or more security threat hashes, generate one or more threat indicators representing the one or more security threats in the ICS system based on the one or more ICS computing component information items.

13. The apparatus of claim 12, wherein the one or more security threats are each associated with one of the one or more ICS computing components.

14. The apparatus of claim 12, wherein the one or more security threats are one or more of: one or more known security vulnerabilities, one or more viruses, or one or more trojans.

15. The apparatus of claim 11, wherein the ICS computing component hash information database is configured to store one or more hashes associated with one or more industrial control files, and wherein the computer coded instructions are further configured to, when executed by the processor, cause the apparatus to:
determine one or more predictive indicators associated with at least one of the one or more ICS computing components; and
generate the vulnerability analysis based on the one or more predictive indicators.

16. The apparatus of claim 15, wherein the one or more predictive indicators include one or more of: a version number associated with at least one of the one or more industrial control files, an update timestamp associated with at least one of the one or more industrial control files, or an outdated file flag representing that one or more files associated with at least one of the one or more industrial control files is not in the one or more industrial control files.

17. The apparatus of claim 11, wherein the secure media exchange vulnerability portal is a web-based portal installed on the secure media exchange node.

18. The apparatus of claim 11, wherein the secure media exchange vulnerability portal is associated with the ICS computing component hash information database.

19. The apparatus of claim 11, wherein the one or more ICS computing components do not have access to the world wide web while the ICS is in operation.

20. The apparatus of claim 11, wherein the computer coded instructions are further configured to, when executed by the processor, cause the apparatus to:
query the ICS computing component hash information database based on the hash query to identify at least one component of the one or more ICS computing components; and
store the identified component in an ICS computing components model associated with the ICS.

* * * * *